United States Patent [19]
Anger et al.

[11] Patent Number: 6,009,431
[45] Date of Patent: Dec. 28, 1999

[54] METHODS AND SYSTEMS FOR GENERATING AN MIB FILE

[75] Inventors: Thomas J. Anger, Plano, Tex.; Shing Yu Yeung, Vancouver, Canada; Joyce Bradley, Rowlett; Steven J. Crossley, Plano, both of Tex.

[73] Assignee: Northern Telecom Limited, Montreal, Canada

[21] Appl. No.: 09/052,601

[22] Filed: Mar. 31, 1998

[51] Int. Cl.[6] .................................................. G06F 15/173
[52] U.S. Cl. ........................ 707/10; 707/102; 395/200.53
[58] Field of Search ........................... 707/10, 103, 102; 395/200.31, 200.47, 200.53

[56] References Cited

U.S. PATENT DOCUMENTS

| | | | |
|---|---|---|---|
| 5,559,958 | 9/1996 | Farrand et al. | 714/27 |
| 5,561,769 | 10/1996 | Kumar et al. | 709/202 |
| 5,737,518 | 4/1998 | Grover et al. | 714/38 |
| 5,745,897 | 4/1998 | Perkins et al. | 707/101 |
| 5,761,428 | 6/1998 | Sidey | 709/223 |
| 5,793,646 | 8/1998 | Hibberd et al. | 364/528.11 |
| 5,802,146 | 9/1998 | Dulman | 379/34 |
| 5,822,569 | 10/1998 | McPartlan et al. | 395/500.42 |
| 5,828,830 | 10/1998 | Rangaraian et al. | 714/48 |
| 5,864,865 | 1/1999 | Lakis | 707/103 |
| 5,889,470 | 3/1999 | Kaycee et al. | 340/825.07 |
| 5,913,037 | 6/1999 | Spofford et al. | 709/226 |

OTHER PUBLICATIONS

Stallings, W., "SNMP–based network management: where is it headed?", Telecommunications, vol. 27, No. 6, Jun. 1993, Abstract Only.

*Primary Examiner*—Jean R. Homere
*Attorney, Agent, or Firm*—Carr & Storm, L.L.P.

[57] ABSTRACT

Disclosed is an apparatus for quickly generating an error free MIB file of the type used by a SNMP manager to manage and display error and log trap messages received from agents reporting to said manager. This is accomplished by retrieving data from definition and template libraries to be used in conjunction with a network element database to correctly generate, element by element, a completed MIB file.

4 Claims, 3 Drawing Sheets

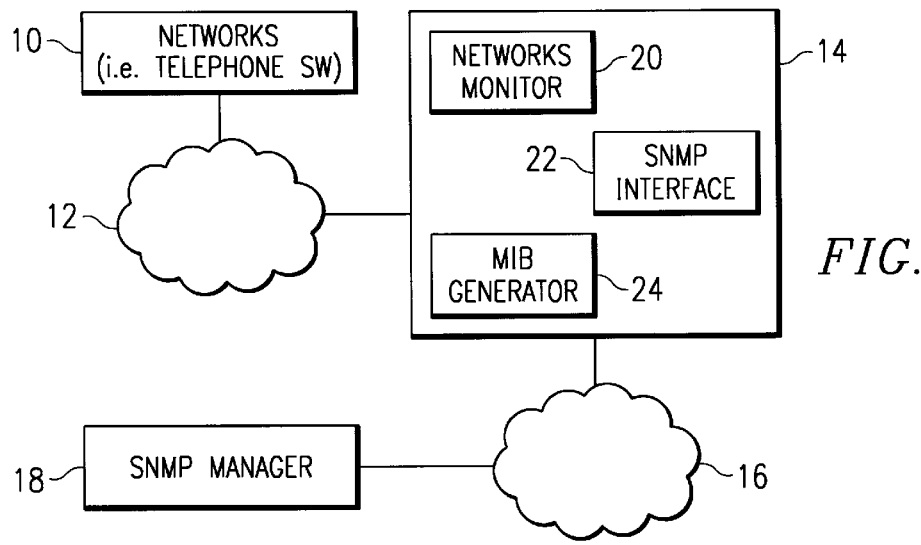
FIG. 1
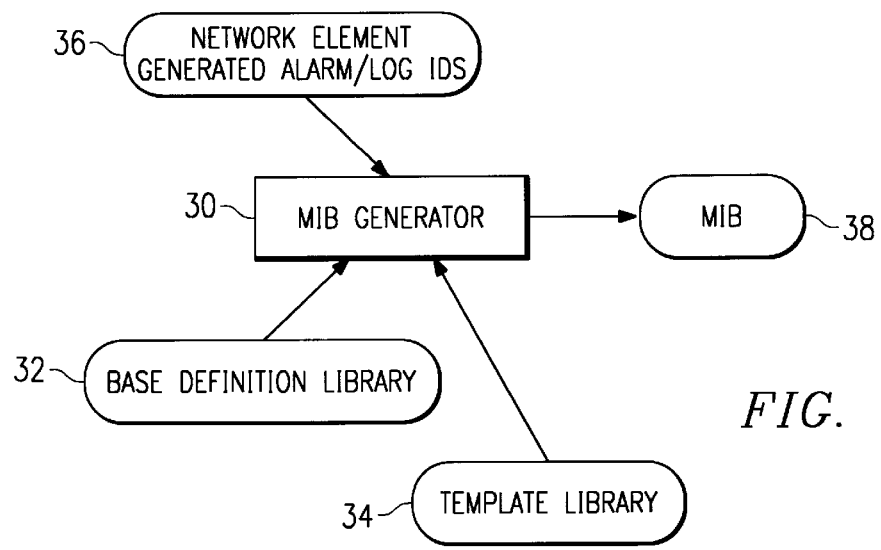
FIG. 2
```
 1    Set-Name-Here  TRAP-TYPE
 2         ENTERPRISE   infostrada
 3         VARIABLES    { fault_clear_indication,
 4                        system_fault_number,
 5                        alarm_group,
 6                        priority,
 7                        message_id,
 8                        switch_id,
 9                        date_and_time,
10                        other_value }
11         DESCRIPTION
12              "Add-Description-Here"
13         : : = Set-Number-Here
```
FIG. 3

```
12    NETWORKS-MIB DEFINITIONS : : = BEGIN
13
14      IMPORTS
15            enterprises
16              FROM RFC1155-SMI
17            OBJECT-TYPE
18              FROM RFC-1212;
                    .
                    .
                    .
25      nortel        OBJECT IDENTIFIER : : = { enterprises 562 }
26      networks      OBJECT IDENTIFIER : : = { nortel 13 }
27      infostrada    OBJECT IDENTIFIER : : = { networks 1 }
28
29      -- Define objects under infostrada
30
31      fault_clear_indication OBJECT-TYPE
32        SYNTAX  OCTET STRING (SIZE(0. .11))
33        ACCESS  not-accessible
34        STATUS  mandatory
35        DESCRIPTION
36              "Possible values are NEW FAULT, CLEAR FAULT, ACCEPT*
37        : : = { infostrada 1 }
38
39      system_fault_number OBJECT-TYPE
40        SYNTAX OCTET STRING (SIZE(0. .11))
41        ACCESS  not-accessible
42        STATUS  mandatory
43        DESCRIPTION
44              "Unique key used to identify a
45               fault within a network system"
46        : : = { infostrada 2 }
47
                    .
                    .
                    .
124     DMSL13820 TRAP-TYPE
125       ENTERPRISE   infostrada
126       VARIABLES    { fault_clear_indication,
127                      system_fault_number,
128                      alarm_group,
129                      priority,
130                      message_id,
131                      switch_id,
132                      date_and_time,
133                      other_value }
134       DESCRIPTION
135                    " "
136       : : = 13820
137
138     DMSL13821 TRAP-TYPE
139       ENTERPRISE   infostrada
140       VARIABLES    { fault_clear_indication,
141                      system_fault_number,
142                      alarm_group,
143                      priority,
144                      message_id,
145                      switch_id,
146                      date_and_time,
147                      other_value }
148       DESCRIPTION
149                    "Call Routed To Treatment"
150       : : = 13821
151
152     END   -- *END
```

FIG. 4

METHODS AND SYSTEMS FOR GENERATING AN MIB FILE

TECHNICAL FIELD

The present invention relates in general to simple network management protocol (SNMP) and in particular to methods and systems for generating a management information base (MIB) such that a network entity (NE) that is not SNMP compliant can communicate traps (error messages) to one or more specific managers in accordance with existing SNMP standards.

BACKGROUND

As networks have grown in size, the networks have become more difficult to manage (ie. monitor and maintain). It was determined that a network management protocol needed to be developed. A protocol initially developed as a quickly designed "temporary" solution to management difficulties was designated simple network management protocol (SNMP). Although improvements have been made to the original SNMP, improvement protocols, such as SNMPv2, still embody many of the essential features of the original SNMP.

While SNMP was designed as a temporary answer to communications problems between different types of networks, no better choice became available and SNMP became the network management protocol of choice. As a result, a large number of network entities (NE) are designed to be SNMP compliant. That is the NE acts as an agent that can receive messages from a network manager and supply responses to the received requests. These network information exchange messages are known in the art as protocol data units (PDUs).

Although there are several types of PDU messages, this invention is concerned with trap messages that are initiated by agents and are used for monitoring various network events such as terminal start-ups, shut-downs and other entity, typically software, events. In many instances, when such a trap message is received by a manager, an error defining message is displayed on a monitor in human readable form so that suitable action may be taken where action is appropriate.

If an NE is not designed as a SNMB compliant entity, the trap event or error messages must be translated to a common format that the SNMB managers can correctly interpret. An SNMP manager may be required to interact with many types of NEs such as routers, servers, repeaters and the like. The trap message is coded so as to be very compact and thus PDUs from two different NEs that appear to be identical may be indicative of entirely different events. To this end, a plurality of trap definitions are incorporated in management information bases (MIBs) that are used by a manager to correctly interpret the trap message being received. Typically a manager accesses a different MIB for each different type NE.

The writing of an MIB is a tedious process that requires one to follow a very stringent set of rules in developing the definition. For an NE that has many events that need to be monitored, the manual preparation of such a file takes thousands of hours. Since an SNMP manager will totally reject an MIB file that incorporates any type of format or syntactical error, many additional hours are often required to debug a defective MIB.

It would thus be desirable to be able to automatically generate an MIB having trap definitions for each of the alarms or logs for which trap messages are to be supplied by a given NE wherein the MIB is free of format or syntactical errors.

Sometimes an entity requires monitoring of new events or presently monitored events may require assignment of different interpretations. In such instances, it would be desirable to generate a new MIB with a minimum of effort and replace the MIB file in the appropriate SNMP managers.

SUMMARY OF THE INVENTION

The present invention comprises a method of and apparatus for generating a management information base (MIB) that can be used by an SNMP manager to properly interpret a trap message.

BRIEF DESCRIPTION OF THE DRAWINGS

For a more complete understanding of the present invention, and its advantages, reference will now be made in the following Detailed Description to the accompanying drawings, in which:

FIG. 1 is a block diagram of a network monitoring and SNMP management system;

FIG. 2 is a block diagram used to describe the process used to generate an MIB;

FIG. 3 comprises a listing for illustrating the type of material in a template library of FIG. 2;

FIG. 4 is a partial listing of an MIB file constructed in accordance with the teachings of this invention.

DETAILED DESCRIPTION

Figure 5:
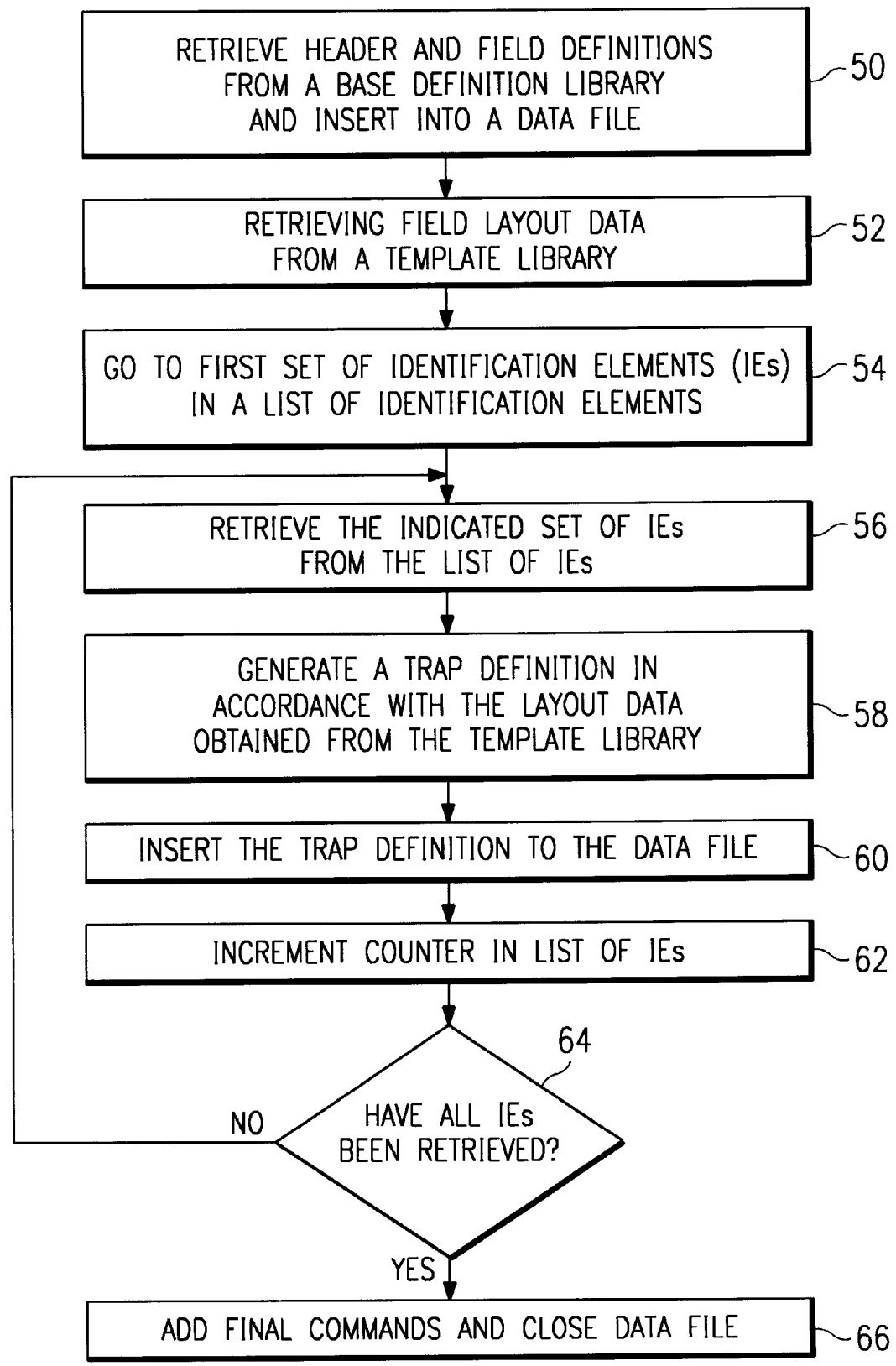
FIG. 5 is a flow diagram to be used in conjunction with the process of describing the method of generating an MIB.

In FIG. 1, a monitored block 10 is labeled NETWORK and there is a further indication that an example of such a network might be a telephone switch. Network 10 is connected via a network communication system 12 to a block 14. Block 14 is connected via a further network communications system 16 to an SNMP manager labeled 18. Systems 12 and 16 would be capable of transferring digital messages. Within block 14 there is shown a block 20 labeled networks monitor, an SNMP interface block 22 and an MIB generator 24.

As will be explained in more detailed later, the monitor 20 receives various alarms and logs from network 10. These alarms and logs are translated according to standardized protocols to a form that can be utilized by an SNMP manager and transmitted over communication network 16 to block 18. If it becomes appropriate to generate a new MIB file, this file can be downloaded using existing file transfer protocol (FTP) procedures into the SNMP manager 18 over the same communication network 16 as was used to transmit the alarms and logs to manager 18. The SNMP manager 18 can then immediately start interpreting incoming data according to the new MIB file.

In FIG. 2 an MIB generator 30 is designed to retrieve data or otherwise receive inputs from a base definition library 32, a template library 34 and a network element generated alarm/logs block 36. The generator 30 transmits the generated output to an MIB block 38 comprising a resultant MIB file.

In FIG. 3, lines 1 through 13 illustrate the contents of the format or template library 34 for one embodiment of the present invention. The first line is the name of the trap. Line number 2 sets forth the name of the particular set of traps to which this particular trap message belongs. Lines 3 through 10 list variables that might be contained in a trap message and which comprise part of the base definitions library 32. Line 12 is a descriptive and human readable presentation of the alarm or log to be displayed on a monitor, while line 13 is utilized for setting forth a given trap identifying number. Thus FIG. 3 sets forth the format or template used by generator 30 in assembling each of the trap elements of the MIB file from data obtained from the database of block 36.

In FIG. 4, an abbreviated example of an MIB file is presented. The omitted lines 1–11 and 19–24 contained explanatory remarks not pertinent to the invention. The omitted lines 48–123 included further field definitions and trap types not pertinent to the explanation of operation of the invention or the MIB file.

As previously indicated, the generator 30 assembles a resultant MIB file using data from various sources. It first retrieves a base definition from block 32. Lines 12–18 and 25–27 comprise identifying data used by SNMP manager 18 to define the source of the received alarm. Lines 31 through 46 define two of the object types or variables listed in the template of FIG. 3. Although, the definitions of the remaining variables shown in FIG. 3 would comprise part of the library 32 and be in the MIB file, these definitions were omitted from FIG. 4 for simplification, as shown by the three vertically spaced dots. In the example used to generate the MIB file of FIG. 4, only a few alarms were used in block 36. The last two of these alarms are defined in lines 124–136 and 138–150. The command END at line 152 instructs the SNMP manager that there are no more trap types defined in this file.

The database 36 in the embodiment shown includes a trap type number, such as 13821, to differentiate that alarm or log from other error messages. For the trap type 13821, line 138 comprises the name of the trap, line 149 comprises the human readable description and line 150 comprises a numerical identifying designation for that trap. Thus the database in block 36 only contains the data in a few lines of each trap definition, such as in lines 149 and 150, even though the definition requires 12 lines to be generated in the MIB file.

Thus the generator 30 generates a traptype similar to that shown in lines 138–150 for each of the designated error message sources to be monitored by the SNMP manager 18 and compiled in the database of block 36. When generator 30 determines that the final data entry has been transformed to a traptype, the final MIB file entry "END" of 152 is supplied and the MIB file in block 38 is deemed complete.

The system set forth is designed to provide a flexible approach to generating an MIB file. However, the addition of further variables to the base definition library 32 and to the template library 34 may introduce errors to an automatically generated MIB file. Thus the generator 30 may include software components such as a syntax checker, semantics checker and template validation apparatus to assist in the detection of material in the libraries that would prevent the generation of an error free MIB file.

The flow diagram of FIG. 5 shows the steps followed by the MIB generator 30 of FIG. 2 in generating to a MIB file of FIG. 4. Prior to the generation of the MIB file, the data in each of the libraries 32 and 34 must be manually assembled along with the data in the list of identification elements of block 36. Once all the information in these three data files, lists or libraries is complete, the generation of the MIB file 38 can commence.

As shown in block 50, the first step of a computer program operating to perform the functions of MIB generator 30 is to retrieve header and field definitions from the base definition library 32 and insert this information into a data file as represented by block 38 in FIG. 2. This header and field definition information is substantially identical to that shown in FIG. 4 in lines 12–18 and 25–47. As previously indicated there are more objects defined than what is shown but the two objects shown in lines 31 through 46 are representative of other objects or variables. The next step, as set forth in block 52, is to retrieve field layout data from the template library 34 of FIG. 2. A counter must be set within the list 36 to the first set of identification elements in this list. Typically when such a list is first accessed, an internal pointer is situated at the first item. However, pointers can always be forced to a given list position such as the first element. Such a step is shown in block 54. At this time the set of identification elements identified by the pointer are retrieved from the list of identification elements. Such a step is shown in block 56. The program then proceeds to block 58 where a trap definition is generated in accordance with the layout data obtained from the template library 34. The program than proceeds to block 60 where the trap definition is inserted into the MIB data file. Such a trap definition might be such as shown in lines 124 through 136 of FIG. 4. At this time the counter or pointer in the list 36 is incremented as shown in block 62. A decision is made at this time as to whether or not all the identification elements have been retrieved as is shown by decision block 64. If there are still identification elements that have not been retrieved and processed, the program returns to block 56 and retrieves the next set of identification elements. Otherwise, a final or closing set of commands, such as the END command as listed on line 152 of FIG. 4, is added to the MIB file and the MIB file is closed as set forth in block 66.

In summary, network 10 provides output signals indicative of various alarms and logs that are received by the networks monitor block 20. Since block 20 is not SNMP compliant, the alarms and logs or other messages that are to be transmitted to SNMP manager block 18 must first be passed through the SNMP trap interface 22. The manager block 18 must, however, have a definition of each of the types of received messages from its agent 14. The definition used by block 18 to interpret incoming signals is obtained from the previously mentioned MIB file.

The MIB file can be quickly generated by generator 30, of FIG. 2, by first retrieving SNMP formatted definitions for each of the fields found in the trap definition or base library 32. As indicated previously these definitions may be customized by the vendor for particular circumstances. Thus they can be modified in to accommodate additional variables as required. The template library 34 is then accessed by generator 30 to add a properly formatted trap type definition for each one of the sets of elements in the assembled database of block 36. When the error messages are received by manager 36, the trap name as set forth in line 1 of FIG. 3, the variables as set forth in lines 3 through 10, and the descriptive information can then be properly interpreted by the manager 18.

The network 10 may be expanded such that added alarms or logs need to be monitored. When this happens, the additional data can be added to the database of block 36, the generator 30 can be activated and a new MIB file can be completed. This MIB file can then be transferred to manager 18, over network 16 using standard FTP protocol downloading techniques known to those skilled in the art. With the computing power available today, the assembly of an error free MIB file, even where the number of element sets in block 36 is in the order of tens of thousands, can be completed in a few seconds. The transfer of the file to manager 18 and installation therein may also be completed in a short period of time to quickly accommodate any required changes in error message management.

Although the invention has been described with reference to a specific embodiment, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method of generating a data file comprising the steps of:

creating a list of identification elements where each element is associated with a unique trap name;

providing a base definition library which defines every field required by trap definitions for a given data file;

providing a template library which defines the relative location of each field in a trap definition;

generating a data file by
1) retrieving header and field definitions from said base definition library and inserting same in the data file,
2) retrieving field layout data from said template library,
3) selecting a first listed identification element from the list of identification elements and generating a trap definition in accordance with the layout data obtained from said template library,
4) adding the trap definition to said data file, and
5) repeating steps 3 and 4 for the remaining identification elements in the list of identification elements; and closing said data file.

2. The method of claim 1 where the data file is computer generated, and the data file comprises a management information base (MIB) for use by a simple network management protocol (SNMP) manager comprising the additional steps of:

inserting a unique identifier element as part of each trap definition; and adding a file END command prior to closing said MIB file.

3. Computer apparatus for generating a data file comprising:

means for storing,
a list of identification elements where each element is associated with a unique trap name,
a base definition library which defines every field required by trap definitions for a given data file, and
a template library which defines the relative location of each field in a trap definition;

means for generating a data file by
1) retrieving header and field definitions from said base definition library and inserting same in the data file,
2) retrieving field layout data from said template library,
3) selecting a first listed identification element from the list of identification elements and generating a trap definition in accordance with the layout data obtained from said template library,
4) adding the trap definition to said data file, and
5) repeating steps 3 and 4 for the remaining identification elements in the list of identification elements; and closing said data file.

4. Apparatus as claimed in claim 3 where the data file comprises a management information base (MIB) for use by a simple network management protocol (SNMP) manager additionally comprising:

means for inserting a unique identifier element as part of each trap definition; and means for adding a file END command prior to closing said MIB file.

* * * * *

UNITED STATES PATENT AND TRADEMARK OFFICE
CERTIFICATE OF CORRECTION

PATENT NO. : 6,009,431
DATED : December 28, 1999
INVENTOR(S) : Anger et al.

It is certified that error appears in the above-indentified patent and that said Letters Patent is hereby corrected as shown below:

Column 1, line 45    Delete "SNMB"
                     Insert --SNMP--

Column 1, line 47    Delete "SNMB"
                     Insert --SNMP--

Column 2, line 46    Delete "detailed"
                     Insert --detail--

Column 4, line 21    Delete "than"
                     Insert --then--

Column 4, line 49    Delete "in"

Signed and Sealed this

Twenty-fourth Day of October, 2000

Attest:

Q. TODD DICKINSON

*Attesting Officer*      *Director of Patents and Trademarks*